(12) United States Patent
Getfield (10) Patent No.: US 7,281,762 B1
(45) Date of Patent: Oct. 16, 2007

(54) PORTABLE PLATFORMS AND METHODS OF USE

(76) Inventor: Kenneth Getfield, 7719 NW. 49th St. Road, Ocala, FL (US) 34482

( * ) Notice: Subject to any disclaimer, the term of this patent is extended or adjusted under 35 U.S.C. 154(b) by 0 days.

(21) Appl. No.: 11/503,223

(22) Filed: Aug. 11, 2006

(51) Int. Cl.
*A47B 83/02* (2006.01)
*A47C 7/62* (2006.01)

(52) U.S. Cl. .................. 297/173; 297/163; 297/188.05
(58) Field of Classification Search ................ 297/173, 297/188.04, 188.05, 188.06, 188.21, 188.2, 297/170, 163; 224/275; 108/3, 5, 50.14, 108/143
See application file for complete search history.

(56) References Cited

U.S. PATENT DOCUMENTS

| | | | | |
|---|---|---|---|---|
| 1,363,759 | A | * | 12/1920 | Cogger ........................ 297/170 |
| 2,787,508 | A | * | 4/1957 | Math ........................... 297/163 |
| 4,159,071 | A | * | 6/1979 | Roca ........................... 297/163 |
| 4,174,669 | A | | 11/1979 | Lalonde |
| 4,359,004 | A | * | 11/1982 | Chappell .................... 108/44 |
| 4,730,760 | A | | 3/1988 | Keller |
| 4,792,183 | A | | 12/1988 | Townsend, III |
| 5,046,433 | A | | 9/1991 | Kramer et al. |
| 5,140,914 | A | | 8/1992 | Bohbot et al. |
| 5,370,060 | A | | 12/1994 | Wang |
| 5,876,092 | A | * | 3/1999 | An ............................. 297/146 |
| 6,085,666 | A | | 7/2000 | Anderson et al. |
| 6,279,800 | B1 | | 8/2001 | Lee |
| 6,591,763 | B2 | | 7/2003 | Getfield |
| 6,830,292 | B1 | | 12/2004 | Yoda |

FOREIGN PATENT DOCUMENTS

GB 2029346 * 3/1980

OTHER PUBLICATIONS

"Auto Rear Tray With Cup Holder, Mirror and Light" http://aggeggi.com (Online Catalogue).
"TE4-1902 Car Backseat Drink/Food Holder and Tray with Plastic Pocket Clip" http://www.globalsources.com (Online Catalogue).
"Backseat Travel Tray" http://www.onlineorganizing.com/ProductsPage (Online Catalogue).

* cited by examiner

*Primary Examiner*—Milton Nelson, Jr.
(74) *Attorney, Agent, or Firm*—Saliwanchik, Lloyd & Saliwanchik

(57) ABSTRACT

Portable platform assemblies, e.g., tray, desk, or shelf, are provided for placement on the backrests of chairs or seats or similarly vertical surfaces. More particularly, the subject invention pertains to platform assemblies that can be placed on the backrest of a front seat in a vehicle, for example, but not limited to, an automobile, and are useful to someone sitting in the back seat of the vehicle. The tray or shelf assembly can be extended, as well as adjusted to a variety of angles useful for writing, reading, eating or other uses. The platform assembly also provides a safety feature that allows the platform to be automatically collapsed and folded upwards or downwards when sufficient pressure is applied at or near the front of the platform assembly.

31 Claims, 4 Drawing Sheets

PORTABLE PLATFORMS AND METHODS OF USE

BACKGROUND OF INVENTION

The subject invention generally relates to portable platform or surface assemblies for affixing to the backrest of chairs or seats. The device of the subject invention is useful for seats that are arranged in rows, or one behind another, as, for example, on buses, trolleys, or even theaters, auditoriums, benches, etc. However, the subject invention is particularly useful in vehicles, especially automobiles. Few vehicles provide built-in platforms, e.g., trays, desks, or shelves, for working or eating, particularly in the backseat of a vehicle, for example a car or truck. Usually an occupant in the vehicle back seat must balance drinks and food, or work on their lap, which can be messy, difficult and uncomfortable.

Various prior art devices provide vehicle backseat trays, desks, tables, etc. for working and/or eating. Many of these devices are adjustable and/or extendable in various aspects. But, most tend to be cumbersome or difficult to use or move, particularly by children. Other prior art devices are inadequately adjustable, often too short or high to be comfortably used by individuals sitting against the back seat. Others are more permanently installed or are difficult to install and, thus, not very portable. Further, prior art devices do not provide adequate safety feature(s) that prevent an individual from being harmed if they bump into or are forcefully pushed against the devices, or if excessive weight is placed on the devices.

There still exists a need for a portable surface useful for eating or working in a rear seat such as the backseat of an automobile or similar vehicle that is easily installed, adjustable for use by various sized individuals and having a safety feature(s) to prevent harm in the event of accidental forceful contact.

BRIEF SUMMARY

The subject invention generally relates to portable platform assemblies, e.g., tray, desk, or shelf, for positioning on the backrest of chairs or seats. More particularly, the subject invention pertains to platform assemblies that can be placed on the backrest of a first seat in a vehicle, for example, but not limited to, an automobile, and are useful to someone sitting in a second seat behind the first seat of the vehicle. The tray or shelf assembly can be extended, as well as adjusted to a variety of angles useful for writing, reading, eating or other uses. The platform assembly of the subject invention also provides a safety feature that allows the platform to be automatically collapsed and folded upwards or downwards when sufficient pressure is applied at or near the front of the platform assembly.

The portable platform assemblies of the subject invention comprise a framework designed to overlap the backrest of a first seat such that the platform hangs down across the rear of said first seat. The platform can be raised or lowered in relation to the framework and maintained at an angle useful to a person sitting in a second seat behind the first seat. In addition, the platform surface comprises one or more sections that can be extended to lengthen the platform. Additional embodiments utilize various extensions that allow the platform surface to be raised or lowered. These features permit the platform to be variously adjustable so as to be reachable to someone sitting against a back or rear seat.

Several U.S. patents describe collapsible seat back trays, including U.S. Pat. Nos. 6,591,763 (Getfield); 6,085,666 (Anderson et al.); 4,792,183 (Townsend); and 5,046,433 (Kramer et al.). However, none of them comprise all of the features of the subject invention, in addition to an adjustable support system that allows the assembly to be completely collapsed in an upward or downward direction. The devices of the subject invention are weight and/or pressure sensitive, such that weight that exceeds a pre-determined threshold amount placed on the surfaces or pressure that exceeds a pre-determined threshold amount applied at or near the front of the platform surface will cause the platform to collapse, preventing damage to the platform assembly, the seat to which it is affixed, or to a backseat occupant or items that may be forcibly pushed against the devices, such as in an accident. The system allows the platforms of the subject invention to collapse in either an upward or downward direction, depending upon the angle of inclination, if excessive force is exerted on or near the front of the platform. The ability of the platform assembly to react to excessive force(s) makes the devices safer for users since, in the event of forceful contact, such as might occur in an accident, the device will be automatically collapsed to reduce or eliminate harm to the backseat occupant.

The devices of the subject invention may also comprise an assortment of other functional or decorative features, affixed thereon, such as, for example, drink holders, lights, pen/pencil holders, clips, bag holders, trash compartments, various grooves, edges or pockets, book supports, magazine holders, etc. Such accessories can be permanently or removably affixed to any of a variety of positions on the device, including the sides or surfaces of the various elements. Further, there may be various apertures or openings in any of a variety of positions on the device to accommodate cords for electrical devices. In addition, the surfaces of the device may be entirely flat or comprise one or more lips or edges, grooves, cut-outs, depressions, etc. to prevent items from rolling, sliding, spilling, or otherwise moving from the surface of the platforms.

DETAILED DISCLOSURE

The subject invention pertains to portable platform assemblies, e.g., trays, desks, or shelves, for positioning on the backrest of chairs or seats. More particularly, the subject invention pertains to platform assemblies that can be placed on the backside of a first seat in a vehicle, for example, but not limited to, an automobile, to be used by an occupant sitting in a second seat behind the first seat of the vehicle. For example, the first seat can be a front seat of a vehicle, e.g., driver or passenger seat, with two rows of seats, or a second-row seat in a vehicle with third-row seating. The tray or shelf assembly can be extended, as well as adjusted to a variety of angles useful for writing, reading, eating or other uses. The platform assembly of the subject invention also provides a safety feature that allows the platform to be automatically collapsed and/or folded upwards or downwards when sufficient pressure is applied at or near the front of the platform assembly, i.e., applied at or near that portion of the platform assembly that is furthest away from the seat to which the assembly is affixed.

Figures 1, 2:
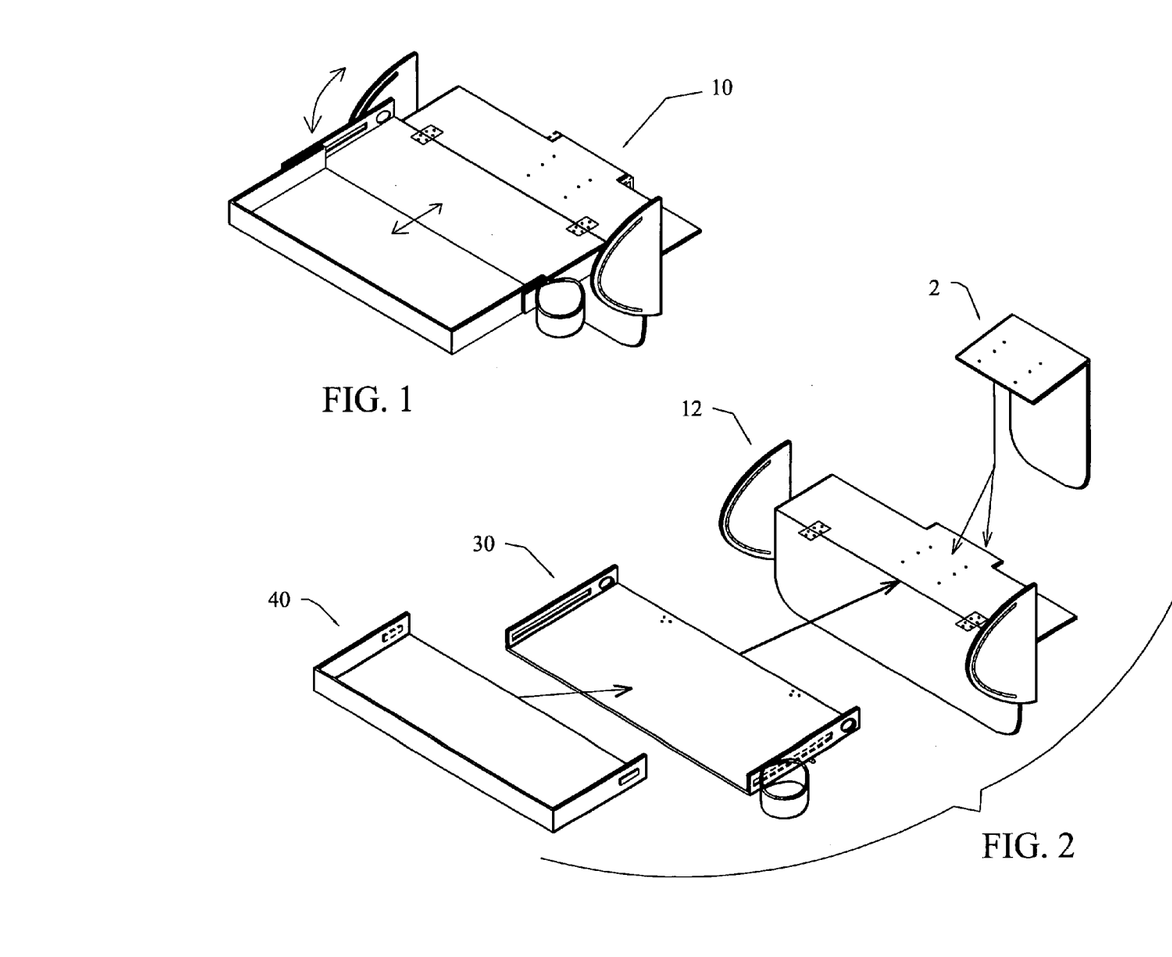
FIG. 1 is an illustration of an embodiment of a platform assembly of the subject invention.
FIG. 2 is an illustration of separate components of an embodiment of the subject invention and how they are assembled.

With reference to the attached figures, which depict typical embodiments of the invention and are not, therefore, to be considered limiting in scope, it can be seen that the assembly comprises a platform of two more sections affixed to an adjustable platform mechanism, which is further affixed to a bracket for holding the entire device over the upper portion of a seat. FIG. 1 illustrates a typical embodiment of the assembled device 10. In this embodiment, the platform is extended and adjusted to be essentially perpendicular to the vertical back of a seat to which it is attached. FIG. 2 illustrates how the various components of this embodiment can be fitted together. FIGS. 3A-3D illustrate the separate components of this embodiment and their individual elements.

The devices of the subject invention, and the various elements thereof, can comprise one or more of a variety of materials, including, but not limited to, plastics, plexiglass, aluminum, glass, wood or paper products, foams, metals, or combinations thereof, etc. In a preferred embodiment, sturdy lightweight materials are utilized for the devices, for example, but not limited to, plastics, plexiglass, aluminum, wood or paper products, foams, or combinations thereof, etc. However, various alternative embodiments of the devices of the subject invention can utilize heavier or sturdier materials, such as various metals. In addition, any of a variety of decorative features, colors or patterns can be utilized to improve or enhance the look or comfort of the device.

While it is contemplated that the devices of the subject invention would be useful to an occupant in a rear seat, it should be understood that the devices may also be used in a front-facing position. The adjustability of the devices of the subject invention can allow the device to be appropriately angled for use by a person sitting beside a seat or chair when the devices of the subject invention are affixed to the front side of the chair or seat.

Figures 3A, 3B, 3C, 3D, 4:
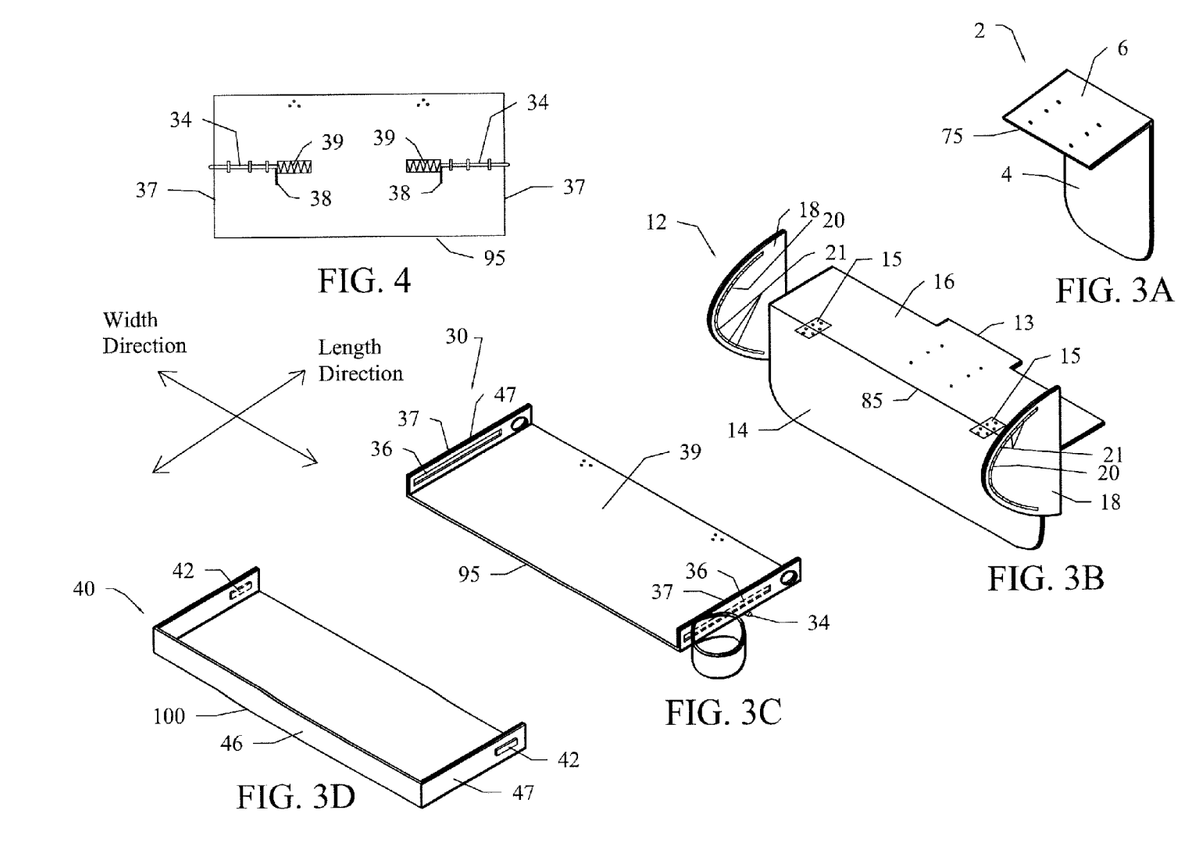
FIG. 3A is an illustration of an embodiment of a bracket that can be used the subject invention.
FIG. 3B is an illustration of an embodiment of a platform adjustment mechanism that can be affixed to the bracket shown in FIG. 3A in an embodiment of the subject invention.
FIG. 3C is an illustration of an adjustable platform section that can be affixed to the platform adjustment mechanism shown in FIG. 3B in an embodiment of the subject invention.
FIG. 3D is an illustration of an extendable platform section that can be affixed to the adjustable platform section shown in FIG. 3C in an embodiment of the subject invention.
FIG. 4 is an illustration of the underside of an adjustable platform section of the subject invention showing one embodiment of an adjustment mechanism.

As seen in these figures, one embodiment of the platform assembly 10 utilizes a bracket 2 comprising at least two legs coupled at a generally right angle. In this embodiment, a first leg 4 of the bracket 2 is positioned substantially perpendicular to a second leg 6, in a general "L" shaped configuration. Also in this embodiment, the first leg 4 is positioned against the front face of the seat or other structure to which the platform assembly will be affixed. The first leg 4 can have any of a variety of circumferential or three-dimensional shapes and sizes suitable for stabilizing the platform assembly against the seat. It can also comprise one or more sections, or there may be two or more first leg 4 elements. For example, the first leg can comprise one or more extensions, or comprise two or more sections that can be further adjustable to accommodate different types of seats or structures to which the platform assembly can be affixed. By way of further example, the first leg 4 can comprise two or more pieces or sections that can be rotated closer or further apart as necessary. In an alternative embodiment, the bracket comprises a single first leg 4. Additionally, the first leg 4 may comprise any of a variety of shapes that are ergonomically suited for the comfort of a person sitting in the seat to which the platform assembly is affixed. For example, the first leg 4 of the bracket may be curved or bowed to accommodate a person's head or shoulders, or it can have extensions or padding for the support or comfort of an occupant in the front seat. In a preferred embodiment, the first leg 4 is flattened so as to not interfere with or cause discomfort to a person sitting in the seat to which the bracket has been attached and provide maximum contact with the seat face for securing the device. In a further preferred embodiment, the first leg 4 is padded. In a still further preferred embodiment, the first leg 4 is approximately 4.0 inches to about 6.0 inches in width, so as to fit between dual support headrests, if necessary. In yet a further preferred embodiment, the first leg 4 is approximately 6.0 inches to about 9.0 inches in length. Further alternative embodiments utilize a flared or otherwise widened first leg 4 that presses against the front face of the seat to provide greater contact for stabilizing the platform assembly. In still further alternative embodiments, the first leg 4 has ridges, knobs, or other protrusions on all, or at least a portion of, the surface that contacts the seat face. Such ridges, protrusions or the like are harmless to the seat face, but further stabilize the platform assembly and reduce sliding or tipping, e.g., through friction, of the device. In a further preferred embodiment, the first leg 4 is padded on one or both sides to protect the seat face and/or contribute to the comfort and safety of a front seat occupant.

As seen in FIG. 3A, the bracket 2 further comprises a second leg 6 fixedly connected to and extending at approximately a right angle from the first leg 4, such that said first leg 4 and said second leg 6 are stationary relative to each other. While the angle between said first leg 4 and said second leg 6 can vary, the angle should ensure proper and sufficient contact with the front face of the forward seat to reduce sliding or other movement without damage to the seat. In an alternative embodiment, the angle between the first leg 4 and the second leg 6 can be made adjustable by various techniques and devices known in the art. For example, the legs can be connected by a hinge or bracket that allows the legs to rotate freely, or be locked in a preferred position or angle. In a preferred embodiment, the first leg 4 and the second leg 6 are fixedly attached and stationary to each other and form an angle of about 85.0° to about 95.0°.

The second leg 6 can also assume a variety of circumferential shapes and sizes and may have any of a variety of ridges, protrusions, or padding, as discussed above. However, in a preferred embodiment, at least a portion of the second leg 6 is sufficiently narrow in width such that the second leg 6 is capable of being positioned between dual headrest supports that extend from the top of many automobile seats. Thus, in one embodiment, the second leg 6 is approximately 4.0 inches to about 6.0 inches in width, so as to fit between dual support head rests 78, or similar fixtures, if necessary. An alternative embodiment comprises a second leg 6 being sufficiently wide to go around one or more head rest supports 77 with a channel or opening therein to accommodate the headrest supports.

In alternative embodiments, the widths of the first leg 4 and the second leg 6 can differ, with one or the other being wider or narrower than the other. Alternative embodiments can utilize a bracket 2 with one or more channels therethrough to accommodate head rests 78 having one or more headrest supports 77. In an alternative embodiment, a platform assembly kit is provided having multiple bracket 2 configurations therein that allow the platform assembly 10 to be used on a variety of seats with or without headrests or other attachments. Such kit can include a variety of types of first leg 4 elements and second leg 6 elements that can be connected in a plurality of combinations to accommodate any of a number of structures to which the platform assembly device 10 can be affixed. For example, in one embodiment, a bracket can comprise a first leg 4 having two or more rotatable sections connected to a second leg 6 having one or more channels therein for affixing the platform assembly device 10 to a padded car seat having a headrest with one or more support structures. In another alternative embodiment, the bracket can comprise a first leg 4 having a single element for positioning against a structure and a second leg 6 being wider than the first leg 4 and able to stabilize the platform assembly device when affixed to a structure having a generally flat horizontal surface.

As with their width, the first leg 4 and the second leg 6 can be the same length or differ in length, with one or the other being shorter or longer than the other. As will be seen from the discussion below, the length of the second leg 6 can be dependent upon associated elements of the device to which it will be affixed. However, in a preferred embodiment, the length of the second leg 6 is approximately 3.0 inches to about 5.0 inches.

As seen in FIGS. 2 and 3B, the second leg 6 of the bracket 2 is coupled to a platform adjustment mechanism 12. Any of a variety of techniques known to those of skill in the art can be utilized to couple these elements of the platform assembly 10. For example, the coupling device can comprise one or more fasteners, such as screws, nuts and bolts, hook and loop fasteners, etc. Preferably, such coupling methods or devices provide for easy disassembly to maintain the overall portability of the platform assembly 10. In a further preferred embodiment, the coupling device allows for adjustment of the bracket 2 and the platform adjustment mechanism 12 to accommodate a variety of chair or seat thicknesses. In one embodiment, one or more, preferably at least two, nuts and bolts are utilized to join the second leg 6 of the bracket 2 to the platform adjustment mechanism 12. In a further embodiment, the nuts and bolts can be utilized with one or more apertures 3 (for example, but not limited to, a plurality of arranged holes, two or more slots or channels, etc.) that allow the bracket 2 and platform adjustment mechanism 12 to be appropriately adjusted, as discussed below, before being coupled. However, it would be well within the skill of a person trained in the art to create alternative modes for temporarily, but securely, coupling these elements and such alternatives are contemplated to be within the scope of the present invention.

It can be seen in FIG. 3B that the platform adjustment mechanism 12 comprises at least two flanges coupled in generally a right-angle. The first flange 14 works in tandem with the first leg 4 of the bracket 2 to stabilize the platform assembly 10 on a chair, seat or other substantially vertical structure. The first flange 14 is positioned against the rear of a seat, while the first leg 4 of the bracket 2 is positioned against the front of a seat. Further, as mentioned above, the subject invention advantageously provides devices for adjusting the distance between the first leg 4 of the bracket and the first flange 14 to accommodate a variety of seat or chair widths. In a still further embodiment, the second leg 6 of the bracket 2 is substantially perpendicular to the first leg 4 of the bracket 2 and parallel to the second flange 16 of the platform adjustment mechanism. As indicated by the arrows in FIG. 2, the second leg 6 of the bracket 2 can be coupled to the platform adjustment mechanism 12, by placing the second leg 6 either above or below the second flange 16. In operation, the bracket 2 and the platform adjustment mechanism 12 can be moved closer or further apart, which simultaneously moves the first flange 14 and the first leg 4 closer or further apart, as necessary to accommodate the seat back on which the device of the subject invention is to be installed. In a preferred embodiment, the first leg 4 and the first flange 14 are positioned firmly against a seat front and seat back, respectively, to prevent rocking, sliding or other displacement of the platform assembly 10.

Once positioned on a seat, first flange 14 and first leg 4 can be moved or pressed towards each other, with a seat back therebetween, such that the pressure between these elements assists in maintaining the device's position on the seat back. Once properly placed and pressed together, the associated second leg 6 and the second flange 16 can be coupled to maintain the position of the first flange 14 and the first leg 4. As discussed above, a wide variety of methods and techniques useful for removably engaging the second leg 6 of the bracket 2 and the second flange 16 of the platform adjustment mechanism 12 will be apparent to those skilled in the art. For example, certain embodiments may utilize one or more screws, pressure pins, or push-rod mechanisms. In a preferred embodiment, one or more nuts and bolts are utilized to removably engage the second leg 6 of the bracket 2 and the second flange 16 to secure and maintain a preferred position of the first flange 14 relative to the first leg 4. In a further preferred embodiment, at least two sets of nuts and bolts are utilized.

It can further be seen in FIGS. 2 and 3B that the platform adjustment mechanism 12 further comprises one or more, preferably two, adjustment arms 18 that have one or more adjustment tracks 20 therein. The adjustment arms 18 and adjustment tracks 20 work in association with additional elements of the device and will be discussed in context below.

The dimensions of the platform adjustment mechanism 12 can certainly vary depending upon the intended use (on a vehicle seat, bus seat, standard foldable chairs, upholstered chairs, theater seat, etc.). But, for most uses or use in an automobile, a width of about 14.0 inches to about 18.0 inches would be sufficient. In a preferred embodiment, the width is approximately 15.0 inches to about 17.0 inches. But, in a most preferred embodiment, the width of the platform adjustment mechanism is approximately 16.0 inches. Further, the length of the platform adjustment mechanism 12 can be dictated by the amount of available storage space between a front and rear seat of the intended location of use, and, the space available to store the device when in a fully folded up position. In most instances, a platform adjustment mechanism 12 having a length of approximately 3.0 inches to about 6.0 inches is sufficient. As mentioned above, the length of the second leg 6 of the bracket 2 can depend upon the length of the platform adjustment mechanism 12. In one embodiment, the lengths of these elements are substantially the same. However, in a preferred embodiment, the length of the second leg 6 of the bracket is shorter than the length of the platform adjustment section 12. This can ensure that, when fitting over more narrow-backed chairs, the distal edge 75 of the second leg 6 of the bracket 2 will not extend past (if placed above) or contact (if placed below) the distal edge 85 of the platform adjustment mechanism. As mentioned above, the devices of the subject invention can be included in a kit that provides a variety of bracket designs to accommodate any of a variety of chair backs or similar objects to which the subject invention can be attached.

A further element of the device of the subject invention is an adjustable platform section 30, which is moveably coupled to the platform assembly mechanism 12, by attachment at or near the distal edge 85 of the second flange 16. The coupler 15 between the adjustable platform section 30 to the second flange 16 of the platform assembly mechanism 12 may comprise any of a variety of devices known in the art, including, but not limited to, hinges, straps, cords, flexible molding, tension springs, etc. An alternative embodiment utilizes a coupler that allows the adjustable platform section 30 to be removed from the adjustable platform section 12 for storage, cleaning, etc.

In a preferred embodiment, the coupler 15 provides the adjustable platform section 30 an angle of motion in both an upwards and downwards direction, relative to the second flange 16, wherein the adjustable platform section 30 being directly aligned and parallel to the second flange 16 of the platform adjustment mechanism (for example as shown in FIG. 1) represents 180°, and rotation upwards or downwards represents a larger or smaller angle. For example, in one embodiment, the adjustable platform section 30 can be rotated to a fully up position to form an angle with the second flange 16 of approximately 90.0° to about 80.0°, preferably about 90.0° to about 85.0°. In a fully down position, the adjustment platform section 30 forms an angle with the second flange 16 of approximately 250.0° to about 290.0°, preferably about 270.0°. Thus, the full range of motion of the platform adjustment mechanism 30 encompasses approximately 160.0° to about 210.0°, preferably about 180.0°.

In a preferred embodiment, once the adjustment platform section 30 has been rotated to the appropriate angle for eating, working, reading, etc. the adjustment platform section 30 can be held in one position that is desired at that time. Any of a variety of devices useful for holding the adjustment platform section 30 in the preferred position, e.g., adjustable arms, brackets, trusses, latches, etc., will be apparent to those skilled in the art from the description herein. However, in a preferred embodiment, such holding devices are able to secure the adjustment platform section 30 for the desired task, but be easily adjustable to accommodate a variety of tasks. In a further preferred embodiment, such holding devices will allow the adjustment platform section 30 the full degree range of rotation, as discussed above.

Thus, in a preferred embodiment, the subject invention utilizes one or more spring-biased pins 34 positioned beneath and extending from one or more sides 37 of the adjustable platform section 30, as illustrated in FIGS. 2, 3C, and 4. In a preferred embodiment, the subject invention utilizes two spring-biased pins 34, positioned on either side 37 of the adjustable platform section 30, for example as shown in FIG. 4. The pins 34 are positioned under the adjustable platform section 30, such that, when the adjustment platform section 30 is rotated, the pins 34 follow the same rotation path as the adjustment platform section 30, the advantages of which will be discussed below. The spring-bias of the pins 34 ensures that they extend from the sides 37 of the adjustable platform section 30, unless actively retracted to be under the adjustable platform section 30. Thus, in a further preferred embodiment, the subject invention provides a lever 38 for compressing the springs 39 and, thus, retracting, or causing to retract, the pins 34, utilizing any of a variety of devices and methods known in the art, including, but not limited to one or more, levers, handles, tabs, flanges, toggles, etc.

As mentioned above, the adjustable platform mechanism 12 further comprises one or more adjustment arms 18 fixedly attached in a stationary fashion to one end of the adjustable platform mechanism 12, for example as shown in FIG. 3B. In addition, the adjustment arms 18 have one or more adjustment tracks 20 thereon, where the path of the adjustment tracks 20 correspond to the path(s) followed by the one or more spring-biased pins 34, as discussed above. The adjustment tracks 20 further comprise a plurality of notches 21 therein, spaced at intervals along the length of the adjustment tracks 20. One embodiment comprises notches spaced throughout the full length of the track, such that the platform assembly can be rotated and secured at any point along the track. In an alternative embodiment, a section nearest the lower end of the track does not comprise notches. In this alternative embodiment, the platform assembly 10 can swing freely when it is rotated downward such that the spring-biased pins enter that section of the track without notches. A specific, non-limiting, example is a track that permits the platform assembly 10 to swing freely from an angle of approximately 250.0° to about 290.0°.

In operation, the ends of the one or more spring-biased pins 34 that extend past the sides of the adjustable platform section 30, as shown in FIG. 4, are positioned within the one or more adjustment tracks 20 and engage with the notches 21 therein. Thus, by compressing the one or more springs and retracting the one or more pins 34, the adjustable platform section 30 can be rotated up or down. By releasing the spring and allowing it to decompress, the one or more pins 34 return to the extended position along the sides of the adjustable platform section 30, which causes them to engage with notches 21 in the adjustment tracks 20. Thus, the one or more pins 34 act as supports for the adjustable platform section 30. In a preferred embodiment, the subject invention utilizes two spring-biased pins 34 positioned on either side 37 of the adjustable platform section 30, two adjustment arms 18 having single adjustment tracks 20 thereon, such that the left and right sides 37 of the adjustable platform section 30 are supported by at least one spring-biased pin 34. In one embodiment, each of the spring-biased pins 34 further comprise a lever 38 which allows them to be compressed by a user. In an alternative embodiment, the subject invention comprises a single lever, handle, latch, etc. affixed to the dual springs 39 that allow said springs to be simultaneously compressed by turning, twisting, pulling, etc. This allows the device of the subject invention to be single-handedly adjusted and fixed at the desired angle, a technique known to those with skill in the art.

In a further embodiment, the compression tension of the one or more springs 39 that assist with the engagement of the one or more pins 34 with the notches 21 in the adjustment track 20 is calibrated to be reactive to specific pressures applied to the platform assembly 10. In a preferred embodiment, the application of pressure and/or weight that equal or exceed pre-determined threshold amounts applied to the upper or lower platform surfaces or at or near the distal edges 100 or 95 of the platform assembly causes the pins 34 to be forcibly disengaged from the notches 21 on which they were positioned, allowing the adjustable platform section 30 to advantageously rotate upwards or downwards, depending upon the angle of inclination. The degree to which the adjustable platform section 30 will be forcibly rotated upwards or downwards will depend upon the amount of weight and/or force and how long it is applied. For example, in certain situations, a person or object behind the seat to which the platform assembly 10 of the invention is affixed could be forcibly pushed against the platform assembly. If the platform assembly was positioned at an angle greater than 180°, the force applied to the platform assembly would cause it to advantageously collapse downward. Conversely, if the platform assembly was positioned at an angle smaller than 180°, the force applied to the platform assembly would cause it to advantageously collapse upward. This collapsibility of the platform assembly is a safety feature that reduces or prevents damage to the platform assembly and injury to a rear seat occupant or objects in a rear seat. Therefore, it can be preferable for the platform assembly to be automatically collapsible without the need for extreme force. In a particular embodiment, for use in an automobile, the platform assembly can be collapsed with an applied weight or force of approximately 4 lbs. to approximately 6 lbs.

In a further embodiment, the shape of the one or more pins 34 can be designed to aid in disengagement from the notches 21 when a predetermined threshold amount of pressure is applied to the platform assembly. In a preferred embodiment, the portion of the end of the pin(s) 34 that engage with the notches 21 are smoothly rounded, forming an essentially conical tip. When a maximum pressure or weight is applied to the platform assembly 10, the rounded end of the pins 34 will be forcibly slid across the surface of the notches 21, which compresses the spring(s) 39 at the opposite ends of the pins, thus, allowing the adjustable platform section 30 to rotate in the direction of the weight or force applied thereto.

Figure 5:
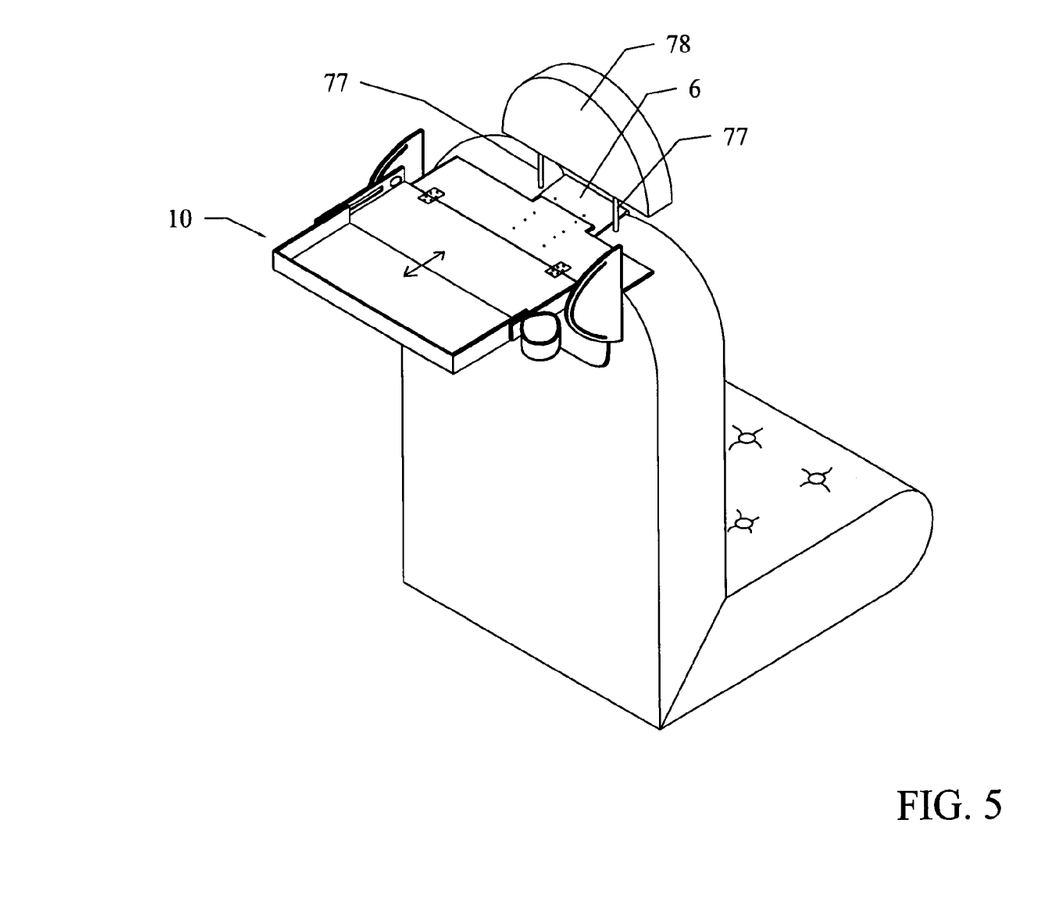
FIG. 5 is an illustration of an embodiment of a platform assembly of the subject invention installed on a seat backrest.

While the dimensions of the adjustable platform section 30 can vary widely, one should consider the method for adjusting the angle of the adjustable platform section 30, as well as the space in which the entire platform assembly of the subject invention is intended to be used, and the rotation parameters outlined above. In one embodiment, at least a portion of the width of the adjustable platform section 30 can be considerably wider or narrower than the platform adjustment mechanism 12. However, in a preferred embodiment, shown for example in FIG. 5, the width of the adjustable platform section 30 is compatible with, and approximately the same as, the width of the second flange 16 of the platform adjustment mechanism 12. In a preferred embodiment, the adjustable platform section 30 can be rotated up and positioned between the adjustment arms 18. In a further preferred embodiment, the length of the adjustable platform section 30 is approximately 6.0 inches to approximately 8.0 inches. But, in a most preferred embodiment, the length of the adjustable platform section 30 is approximately 6.5 inches to about 7.5 inches.

As seen in FIGS. 2 and 3D, the platform assembly 10 of the subject invention further comprises a platform extension 40 affixed to the distal end 95 of the adjustable platform section 30. The platform extension 40 provides additional length and work space to the platform assembly 10. In one embodiment, the adjustable platform section 30 comprises one or more hinges that permit the platform extension 40 to be folded over and placed flat against the adjustable platform section 30, which can then be rotated up for storage. However, in a preferred embodiment, the platform extension 40 is slidably affixed to the adjustable platform section 30, such that a surface of said platform section can slide parallel to a surface of the adjustable platform section 30, but is not disconnected from the adjustable platform section. For example, in one embodiment, one or more sides 47 of the platform extension 40 have protruding knobs 42 that engage with slide tracks 36 within the sides 37 of the adjustable platform section 30, one example of which is shown in FIGS. 1, 3C and 3D. This allows the platform extension 40 to be slid over the upper surface 39 of the adjustable platform section 30 to lengthen the overall work surface of the platform assembly 10, or shorten the work surface for storage. A person with skill in the art can determine any of a variety of alternative techniques or devices for slidably affixing these elements of the invention and obvious variations are contemplated to be within the scope of the subject invention.

As discussed above for other elements of the platform assembly 10, the dimensions of the platform extension 40 can vary. However, in preferred embodiments, the width of the platform extension is compatible with the width of the adjustable platform section 30. Thus, in a preferred embodiment, where the platform extension 40 is slidably affixed to the adjustable platform section 30 as described above, the width of the platform extension 40 is sufficiently narrow to permit the platform extension 40 to slide over, or into, the adjustable platform section 30. In addition, the length of the platform extension 40 can also vary. But, in a preferred embodiment, the length is approximately 5.0 inches to about 7.0 inches.

Figure 6A:
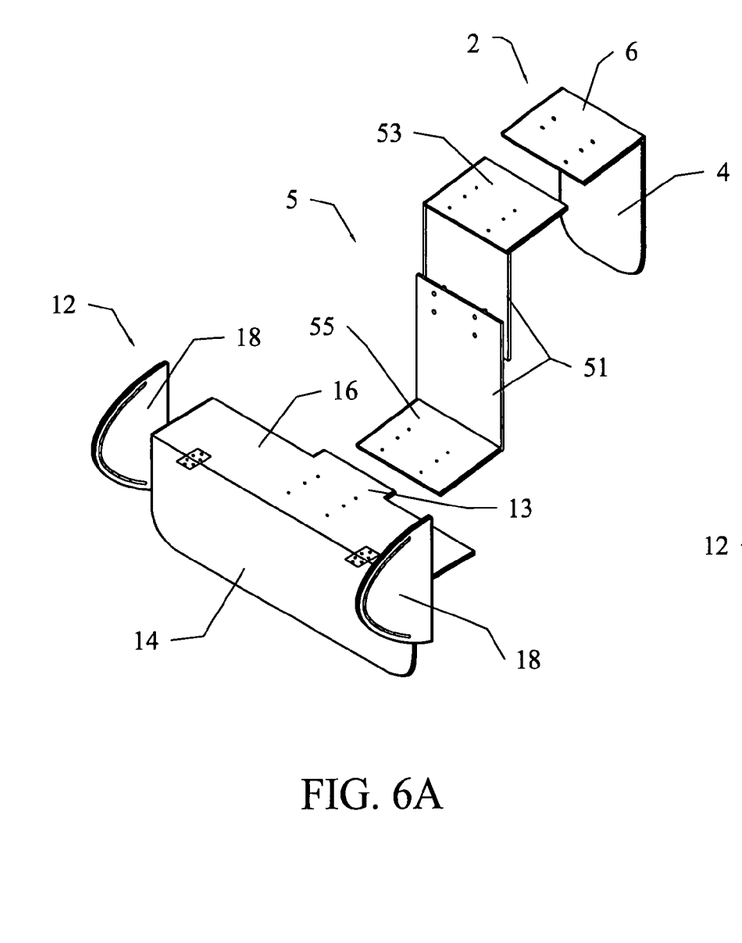
FIGS. 6A and 6B illustrate embodiments of extensions that can be utilized with a platform assembly of the subject invention.
Figure 6B:
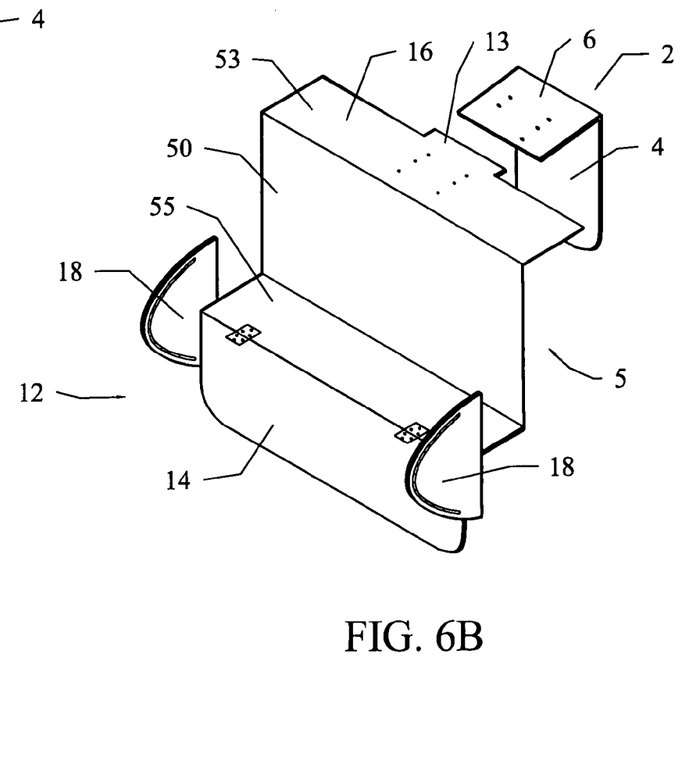

For certain applications of the platform assembly device 10 of the subject invention, it may be desirable or necessary to lower the platform adjustment mechanism 12 or certain components thereof, so that the adjustable platform section 30 and extendable platform section 40 are more accessible for certain users. As such, several types of extension arms 5 can be utilized, for example as shown in FIGS. 6A and 6B. As can be seen in these Figures, an extension arm 5 can comprise a separate element of the platform assembly device (FIG. 6A) or it can be formed as part of the platform assembly device (FIG. 6B). A person with skill in the art will be able to determine the most appropriate type of extension arm 5 for the intended use of the platform assembly device.

In one embodiment, shown for example in FIG. 6A, the extension arm 5 can be a separate element of the platform assembly device 10. In this embodiment, the extension arm 5 can comprise a generally vertical, elongated panel 50 that can be further divided into one or more adjustable panel sections 51. The dimensions of the extension arm 5 can be variable and will be determined by a person with skill in the art having benefit of the current disclosure and knowledge of the expected use of the platform assembly devices of the subject invention. The panel sections 51 can be adjustable by any of a variety of techniques and devices known in the art. In one embodiment, the panel sections 51 are adjustable while the platform assembly device is affixed to a structure (e.g., chair, drawer, wall, etc.) A first arm flange 53 can be affixed to one end of the extension arm 5 for adjustably attaching the extension arm to the second leg 6 of a bracket 2. Further, a second arm flange 55 can be affixed to the opposite end of the extension arm 5 for adjustably attaching the extension arm to the second flange 16 of the platform adjustment mechanism 12. In this embodiment, the extension arm 5 can be attached to the bracket 2 and the platform adjustment mechanism 12 by any of a variety of techniques known to those with skill in the art. However, it can be preferable for the extension arm 5 to be attachable by the same technique and devices that attach the bracket 2 and platform adjustment mechanism 12, when an extension arm is not utilized.

In an alternative embodiment, shown for example in FIG. 6B, the extension arm 5 is formed as part of the platform adjustment mechanism 12. In this embodiment, the extension arm 5 can also comprise an elongated panel 50 that is generally vertical when the platform assembly device 10 is affixed to a structure. The extension arm 5 can be further divided into one or more adjustable sections 51, similarly to that shown in FIG. 6A. As stated above, the dimensions of the extension arm 5 can be variable and will be determined by a person with skill in the art having benefit of the current disclosure and knowledge of the expected use of the platform assembly devices of the subject invention. If necessary or desired, the panel 50 can be made adjustable by any of a variety of techniques and devices known in the art. In one embodiment, the panel 50 is made to be adjustable while the platform assembly device is affixed to a structure (e.g., chair, drawer, wall, etc.) Further, in this embodiment, the second flange 16 of the platform adjustment mechanism 12 becomes fixedly or rotatably attached to the upper end of the panel 50, as shown in FIG. 6B. A strut surface 55 is positioned at or about the original position of the second flange 16. Thus, the second flange 16, in the new position, can still be adjustably affixed to the second leg 6 of the bracket 2, as described previously. The platform adjustment mechanism 12 and the platform extension 40 may further comprise any of a variety of features that make them compatible for various tasks, including ridges, grooves, edge lips or side walls, etc. to prevent items from sliding or rolling off, or substances from spilling. In a preferred embodiment, the most distal edge 100 of the platform extension 40 has a front lip 46 to aid in holding items on the platform assembly 10. In a more preferred embodiment, the sides of the platform adjustment mechanism 12 and the platform extension 40 comprise additional sidewalls 47 to further assist in holding items on the platform assembly.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A platform device comprising:
   a bracket having attached a first leg and a second leg;
   a platform adjustment mechanism comprising a first flange attached to a second flange, wherein the second flange is adjustably attached to the second leg of the bracket;
   at least one adjustment arm attached to a side of at least the first or second flange;
   an adjustable platform section, rotatably affixed to the platform adjustment mechanism;
   at least one holding device coupled to the adjustable platform section, where the holding device can adjustably engage with the at least one adjustment arm to maintain the adjustment platform section in a position; and
   a platform extension movably affixed to the adjustable platform section.

2. The platform device, according to claim 1, wherein the at least one holding device is weight-sensitive and/or pressure-sensitive, such that the adjustment platform section is collapsible when a pre-determined threshold amount of weight and/or pressure is applied to the adjustment platform section.

3. The platform device, according to claim 2, wherein the adjustment platform section is collapsible in an upward or downward direction depending upon the angle of inclination of the applied weight or pressure.

4. The platform device, according to claim 3, wherein the range of collapsible rotation of the adjustable platform section, relative to the second leg of the platform adjustment mechanism, is about 85.0° to about 290.0°.

5. A platform device, according to claim 2, wherein the holding device comprises at least one spring-biased pin movably coupled to the adjustable platform section and at least one adjustment arm further comprising at least one adjustment track, such that the spring-biased pin engages with the adjustment track to maintain a position of the adjustable platform section.

6. The platform device, according to claim 5, wherein the adjustment track further comprises a plurality of notches with which the spring-biased pin engages.

7. The platform device, according to claim 6, wherein that portion of the spring-biased pin that engages with a notch, of the plurality of notches, is sufficiently curved, such that when a weight or force that equals or exceeds a threshold amount is applied, that portion of the pin is capable of sliding over the notch edge causing simultaneous compression of the spring allowing the pin to engage with a different notch to rotate the adjustable platform section in the direction of the weight or force.

8. The platform device, according to claim 6, wherein the range of rotation of the adjustable platform section, relative to the second leg of the platform adjustment mechanism, is about 85.0° to about 290.0°.

9. The platform device, according to claim 6, wherein the range of rotation of the adjustable platform section, relative to the second leg of the platform adjustment mechanism, is about 90.0° to about 270.0°.

10. The platform device, according to claim 1, wherein said platform extension is slidably engaged with the adjustable platform section such that the platform extension can move across a surface of the adjustable platform section.

11. The platform device, according to claim 10, wherein the platform extension further comprises at least one edge capable of preventing items on the platform device from sliding, rolling or otherwise leaving the surface of the platform assembly device.

12. The platform device, according to claim 1, further comprising one or more accessories selected from the group consisting of cup holders, lights, pen/pencil holders, clips, bag holders, trash compartments, book and magazine supports or holders, storage pockets, and apertures.

13. The platform device, according to claim 1, further comprising an extension arm adjustably affixed between the second leg of the bracket and the second flange of the platform adjustment mechanism.

14. The platform device, according to claim 1, further comprising an extension arm adjustably affixed to the second leg of the bracket and coupled to the platform adjustment mechanism.

15. A platform assembly device kit comprising:
   at least one bracket having attached a first leg and a second leg;

at least one platform adjustment mechanism comprising a first flange capable of being attached to a second flange, wherein the second flange is capable of being adjustably attached to the second leg of the bracket;

at least one adjustment arm that can be attached to a side of at least the first or second flange;

at least one adjustable platform section capable of being rotatably affixed to the platform adjustment mechanism;

at least one holding device for adjustably engaging with the at least one adjustment arm to maintain the adjustment platform section in a position; and a platform extension movably affixable to the adjustable platform section.

16. The kit, according to claim 15, wherein the at least one holding device is weight-sensitive and/or pressure-sensitive, such that the adjustable platform section is collapsible when a pre-determined threshold amount of weight and/or pressure is applied to the adjustment platform section.

17. The kit, according to claim 16, wherein the adjustable platform section is collapsible in an upward or downward direction depending upon an angle of inclination of the applied weight or pressure.

18. The kit, according to claim 17, wherein the range of collapsible rotation of the adjustable platform section, relative to the second leg of the platform adjustment mechanism, is about 85.0° to about 290.0°.

19. The kit, according to claim 15, wherein the at least one bracket comprises one of a plurality of first leg elements capable of being connected to one of a plurality of second leg elements.

20. The kit, according to claim 19, wherein the plurality of second leg elements includes at least one second leg element having at least one opening therein to accommodate a headrest support.

21. The kit, according to claim 19, wherein the plurality of second leg elements includes at least one second leg element of sufficient size to accommodate a headrest having more than one support.

22. The kit, according to claim 19, wherein the platform adjustment mechanism comprises a first flange attached to a second flange.

23. The kit, according to claim 22, wherein the at least one adjustment arm is attached to a side of at least one flange.

24. A method for affixing a platform assembly device to a seat backrest wherein the platform assembly device comprises:

a bracket having attached a first leg and a second leg;

a platform adjustment mechanism comprising a first flange attached to a second flange, wherein the second flange is adjustably attached to the second leg of the bracket;

at least one adjustment arm attached to a side of at least one flange;

an adjustable platform section, rotatably affixed to the platform adjustment mechanism; at least one holding device for adjustably engaging with the at least one adjustment arm to maintain the adjustable platform section in a position; and a platform extension movably affixed to the adjustable platform section;

wherein the method comprises: placing the first leg of the bracket against a surface of the backrest and placing the second leg against the uppermost edge of the seat backrest; placing the first flange of the adjustable platform section on the opposite surface of the backrest; placing the second flange over the uppermost edge of the seat backrest to engage with the second leg; pressing the first leg and first flange toward each other causing them to secure against the surfaces of the backrest; and securing the second leg and second flange to maintain the positions of the first leg and first flange to secure the platform assembly to the seat backrest.

25. A method for affixing a platform assembly device to a seat backrest wherein the platform assembly device comprises at least one bracket having attached a first leg and a second leg;

a platform adjustment mechanism comprising a first flange attached to a second flange, wherein the second flange is adjustably attached to the second leg of the bracket;

at least one adjustment arm attached to a side of at least one flange;

an adjustable platform section, rotatably affixed to the platform adjustment mechanism;

at least one holding device for adjustably engaging with the at least one adjustment arm to maintain the adjustable platform section in a position; and a platform extension movably affixed to the adjustable platform section;

wherein the method comprises: placing the first leg of said at least one bracket against a first surface of the backrest; placing the second leg against the uppermost edge of the backrest; placing the first flange of the adjustable platform section against a second surface of the backrest; placing the second flange over the uppermost edge of the backrest to engage with the second leg of the bracket; pressing the first leg and first flange towards each other sufficiently to secure the platform assembly device against the surfaces of the backrest and securing the second leg and second flange; and rotating the adjustable platform section to an appropriate angle.

26. The method, according to claim 25, wherein the at least one bracket can accommodate one or more seat extensions.

27. The method, according to claim 26, wherein the seat extension is a headrest.

28. The method, according to claim 25, wherein the holding device comprises at least one spring-biased pin movably coupled to the adjustable platform section and at least one adjustment arm further comprising at least one adjustment track, such that the spring-biased pin engages with the adjustment track to maintain a position of the adjustable platform section.

29. The method, according to claim 28, wherein the adjustment track further comprises a plurality of notches with which the spring-biased pin engages to maintain the position of the adjustable platform section.

30. The method, according to claim 29, wherein the end of the spring-biased pin that engages with the notches is rounded, such that when sufficient weight or force is applied, the pin is capable of sliding over the edge of the notch, compressing the spring at the opposite end, and allowing the adjustable platform section to rotate in the direction of the weight or force.

31. The method, according to claim 25, wherein the platform extension is slidably engaged with the adjustable platform section such that the platform extension can slide across a surface of the adjustable platform section.

* * * * *